Patented Feb. 7, 1950

2,496,993

UNITED STATES PATENT OFFICE 2,496,993

REFINING OF RUTILE

Ernest H. Goda, East Cleveland, Ohio, assignor to The Ferro Enamel Corporation, Cleveland, Ohio, a corporation of Ohio No Drawing. Application December 2, 1946, Serial No. 713,469

7 Claims. (Cl. 23—202)

This invention relates as indicated to refining rutile and more especially to the production of a refined product which may be used as a component in the manufacture of porcelain enamel frit.

It is a principal object of my invention to provide a purification process which is effective to remove substantially all of the chromium impurities normally found in rutile or at least to reduce the chromium content, wherein the remaining trace is no longer objectionable.

It is a further object of my invention to provide a process which is productive of a compound containing all of the titanium present in the rutile and which product is completely soluble in sulfuric acid so that, if desired, a sulfuric acid solution of the titanium compound may be produced and substantially pure $TiO_2$ recovered from such acid solution by a simple hydrolysis procedure.

It is a further and more particular object of my invention to provide a porcelain enamel frit opacified by the inclusion therein of the refined titanium compound produced by the process of my invention.

Other objects of my invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention comprises the process of refining rutile which includes the steps of reacting the same in finely divided form at an elevated temperature with an alkali in the presence of an inorganic halide and then water washing the reacted mass to free the same of impurities, particularly chromium, and to yield a product which is substantially sodium titanate and which product is characterized by being soluble in sulfuric acid so that substantially pure $TiO_2$ may be recovered from such sulfuric acid solution by a simple hydrolysis procedure.

The following is a typical analysis of rutile:

Table 1

| | | |
|---|---|---|
| $TiO_2$ | Per cent | 93 to 96 |
| $Fe_2O_3$ | do | 1.5 to 2.5 |
| $SiO_2$ | do | 0.7 to 1.5 |
| $Cr_2O_3$ | do | 0.25 to 0.75 |
| $V_2O_5$ | do | 0.10 to 0.20 |
| $ZrO_2$ | do | 0.50 to 1.50 |
| $MnO_2$ | | Trace |
| Sr, Ba, Ca | | Small amounts |

When rutile is refined in accordance with any of the available prior art processes, there is no substantial reduction in the chromium content. An amount of chromium greater than .01% cannot be tolerated in a porcelain enamel frit since the presence of even such small amounts of chromium results in a yellowish or cream cast to the enamel which should otherwise be pure white. Actually, it is desirable to reduce the chromium content to amounts not in excess of .005% and my process is capable of eliminating the chromium to this extent.

The process entails the steps of first grinding the rutile until it is preferably of such fineness that 90% or more will pass through a 325 mesh sieve. The finely divided rutile is then mixed with finely divided alkali and a small amount of an inorganic halide. This mixture of raw materials is placed in a suitable container such as a ceramic "sagger" and placed in a furnace where it is sintered at a temperature just below the fusion point of the alkali. The length of time of the fusion step is determined largely by the bulk or mass being fused. A sufficient time should be permitted for thorough reaction between the components of the reaction mass. It will usually be found that a sintering time of from 2 to 5 hours will be sufficient for most commercial batches.

After the sintering step, the sintered mixture is a pulverulent mass and may be leached with water in the hot state or permitted to cool to room temperature. The water washing step is preferably done either with the solid material and water stream flowing in counter-current relation, or preferably the washing is performed batchwise with the material sucked dry on the filter, washed on the filter, and then repulped for the next washing, and if this procedure is adopted, then it will be found that usually five washings will be sufficient to reduce the chromium content to the point indicated above, i. e., .005%.

The water washed material will be found to have an analysis which corresponds approximately to $Na_2O \cdot 3TiO_2$ and a substantially uniform water content of approximately 1.14%.

In the following table are given a number of specific examples of batches of refined titanate which have been produced in accordance with my improved process.

Table 2

| Example Nos. | 1 | 2 | 3 | 4 | 5 | 6 |
|---|---|---|---|---|---|---|
| Raw Mix (Parts by Weight): | | | | | | |
| Rutile | 100 | 100 | 100 | 100 | 100 | 100 |
| Na2CO3 | 75 | 75 | 73 | 75 | 75 | 75 |
| NaF | 3.0 | 5.0 | 27.3 | | | 0.6 |
| Cryolite | | | | | 4.1 | |
| AlF3 | | | | | | 1.6 |
| NaNO3 | | | | | | |
| NaCl | | | | 5.4 | | |
| Sintering Conditions: | | | | | | |
| Degrees F | 1,600 | 1,600 | 1,600 | 1,600 | 1,600 | 1,600 |
| Minutes | 150 | 150 | 300 | 480 | 120 | 120 |
| Analysis of Product Per cent by Weight): | | | | | | |
| NaO2 | 22.74 | 22.98 | 21.52 | 19.2 | 22.74 | 22.19 |
| TiO2 | 73.89 | 73.77 | 77.36 | 77.40 | 74.51 | 73.83 |
| Cr | 0.0015 | 0.001 | 0.001 | 0.005 | 0.005 | 0.003 |
| Zr | 0.61 | 0.78 | 0.85 | | 0.60 | 0.66 |
| Fe2O3 | 0.30 | 0.18 | 0.35 | | 0.50 | 0.27 |
| Al2O3 | | | | | 0.74 | 0.89 |
| H2O | | | | | 1.14 | 1.14 |
| Reflectance | 74.2 | 72.6 | 73.9 | 72.8 | 77.4 | 77.8 |

Instead of using sodium carbonate as was used in each of the specific examples given in Table 2 above, other alkali carbonates may be used, such as potassium carbonate, although, because of its low cost and general superiority, sodium carbonate will usually give best results.

The amount of alkali used may vary from a minimum of about 60 parts by weight of alkali to 100 parts by weight of rutile. 75 parts by weight of alkali to 100 parts of rutile should generally be used in order to insure a complete reaction. Any quantity in excess of about 100 parts by weight of alkali to 100 parts of rutile is unnecessary since such larger amount of alkali, being unreacted, will be removed from the sintered mass during the leaching operation. It is important to note, however, that in accordance with my invention, the alkali, up to about 75 parts of alkali per 100 parts of rutile, combines with the rutile and cannot be separated by water washing, no matter how drastic a water wash is effected.

The amount of fluoride used need only be a minor amount since it will be observed that quantities of from 3% to 5% gave satisfactory results which were not improved upon by the use of quantities as great as 27%.

Instead of using sodium fluoride, cryolite may be employed, as per Example 5, and as per Example 6, aluminum fluoride may also be used. While cryolite and aluminum fluoride are desirable for use in that they provide the necessary fluoride content which is necessary in order to insure liberation of the chromium, so that the latter may be eliminated in the water washing operation, nevertheless these fluorine materials have a tendency to impair the water washing step in that water washing becomes considerably more difficult than when using sodium fluoride. The use of aluminum fluoride and cryolite have the advantage, however, in that by their use a certain minimum amount of aluminum is included in the end product and I have found that the presence of such minor amount of aluminum appreciably adds to the opacifying power of the end product when used as a component in porcelain enamel frit.

After the sintered mass has been water washed and a product produced which, as previously indicated, is essentially sodium titanate, such end product, which is produced when the sintering operation is performed with the components including an inorganic fluoride, is totally soluble in concentrated sulfuric acid, whereas if no fluoride is used, the product is not fully soluble in sulfuric acid. This action of the fluoride, or more broadly the inorganic halide, is not thoroughly understood since it will be observed that there is no combined fluorine in the end product. The effect of the fluoride or halide in rendering the end product fully soluble in concentrated sulfuric acid makes my process particularly desirable for the production of substantially pure $TiO_2$ which may be accomplished by dissolving the sodium titanate in sulfuric acid and then recovering the substantially pure $TiO_2$ from the acid solution by a conventional hydrolysis procedure such as those well known in the art. Refined hydrolysis procedures which may be used to advantage are any of those given in Patent Nos. 1,773,727; 1,795,467; 1,820,987 and 1,820,988.

The product resulting from the sintering operation which, as previously indicated, is predominantly sodium titanate may be advantageously employed as a component in porcelain enamel frit. By the use of such material it is possible to produce a porcelain enamel which is pure white and has a high order of reflectance with substantially all of the opacity attributed by the sodium titanate. A typical example of a raw batch mixture which may be smelted in the production of a porcelain enamel frit containing the sodium titanate of my invention is as follows:

Table 3

| | Pounds |
|---|---|
| Dehydrated borax | 159 |
| Feldspar | 143 |
| NaNO3 | 164 |
| Cryolite | 195 |
| ZnO | 96 |
| Boric acid | 345 |
| Sodium titanate (Na2O—18.25%) (TiO2—73.40%) | 400 |
| Powdered Quartz | 1204 |
| Total | 2706 |

The foregoing batch when smelted for 3½ hours at a temperature of 2150° F., gave a reflectance of 75.5% when applied as a single coat on clean steel at a dry weight of application of 25 grams per square foot and when fired for 3½ minutes at 1500° F. Enamels produced utilizing as the opacifier the titanium compound produced by the process of any invention are a substantially clear glass as smelted and develop their opacities due substantially entirely to the action of the titanium compound upon being reheated— that is, during the firing of the enamel onto the work. These enamels, as indicated from the example given above, produce coatings having very high reflectance when applied directly to the sheet steel as a one coat operation.

As previously indicated, the combined use of aluminum with the refined titanium compound produced by the method of my invention gives a higher reflectance in the final enamel than when either of those compounds is used alone. The inclusion of aluminum with the titanium compound may be secured as previously indicated by the use of an aluminum halide or fluoride during the refining of the rutile. Since, however, the presence of the aluminum in the sintered mass has a tendency to impair the facility with which the sintered mass may be water washed, the aluminum may be added to, or combined with, the titanium compound after the water washing operation, as for example by making an admixture of the leached titanium compound with a suitable compound of aluminum such as aluminum oxide and then utilizing such admixture as a smelter addition for the manufacture of porcelain enamel frit. Usually aluminum oxide, when added to a formula like that given in Table 3 above, would be utilized in an amount of about 1% to 2% of the titanium content.

Other modes of applying the principle of the invention may be employed, change being made as regards the details described, provided the features stated in any of the following claims or the equivalent of such be employed.

I therefore particularly point out and distinctly claim as my invention:

1. The process for producing an alkali titanate from rutile which comprises while reacting the same in finely divided form at an elevated temperature with from 60% to 100% by weight of an alkali from the class consisting of hydroxides and carbonates of alkali metals to form titanate, eliminating chromium by the presence of a minor amount of an inorganic halide to react therewith and then water washing the reacted mass.

2. The process for producing an alkali titanate from rutile which comprises while reacting the same in finely divided form at an elevated temperature with from 60% to 100% by weight of an alkali from the class consisting of hydroxides and carbonates of alkali metals to form titanate, eliminating chromium by the presence of a minor amount of an inorganic fluoride to react therewith and then water washing the reacted mass.

3. The process for producing an alkali titanate from rutile which comprises while sintering the same in finely divided form with from 60% to 100% by weight of an alkali from the class consisting of hydroxides and carbonates of alkali metals to form titanate, eliminating chromium by the presence of a minor amount of an inorganic halide to react therewith, the temperature being just below the fusion temperature of the alkali and then water washing the reacted mass.

4. The process for producing an alkali titanate from rutile which comprises while sintering the same in finely divided form with about 75% by weight of finely divided sodium carbonate eliminating chromium by the presence of a minor amount of sodium fluoride and then water washing the reacted mass.

5. The process of refining rutile which comprises while sintering the same in finely divided form with from 60% to 100% by weight of finely divided alkali from the class consisting of hydroxides and carbonates of alkali metals to form titanate, eliminating chromium by the presence of a minor amount of an inorganic halide to react therewith, washing the reacted mass, dissolving the residue in concentrated sulfuric acid and then recovering $TiO_2$ from such acid solution by hydrolysis.

6. The process for producing an alkali titanate from rutile which comprises while sintering the same in finely divided form with from 60% to 100% by weight of an alkali from the class consisting of hydroxides and carbonates of alkali metals to form titanate, eliminating chromium by the presence of a minor amount of an aluminum halide and then water washing the reacted mass.

7. As a new article of manufacture, the product which has an analysis corresponding substantially to sodium titanate and which contains less than about .005% chromium, obtained by sintering rutile with from 60% to 100% by weight of sodium carbonate to form titanate in the presence of a minor amount of sodium fluoride and then water washing the sintered mass.

ERNEST H. GODA.

REFERENCES CITED

The following references are of record in the file of this patent:

UNITED STATES PATENTS

| Number | Name | Date |
|---|---|---|
| 1,932,087 | Richter | Oct. 24, 1933 |
| 1,954,390 | Long | Apr. 10, 1934 |
| 2,337,103 | Heimsoeth et al. | Dec. 21, 1943 |

FOREIGN PATENTS

| Number | Country | Date |
|---|---|---|
| 218,086 | Switzerland | 1942 |
| 442,853 | Great Britain | 1934 |
| 443,155 | Great Britain | 1936 |

OTHER REFERENCES

Thornton, "Titanium," 1927, Monograph Series No. 33, pub. by Chemical Catalog Co., New York, pages 164, 165 & 174.